US012018804B2

(12) United States Patent
Van Bommel et al.

(10) Patent No.: US 12,018,804 B2
(45) Date of Patent: Jun. 25, 2024

(54) LED FILAMENT LAMP OF CANDLE LIGHT APPEARANCE

(71) Applicant: SIGNIFY HOLDING B.V., Eindhoven (NL)

(72) Inventors: Ties Van Bommel, Horst (NL); Rifat Ata Mustafa Hikmet, Eindhoven (NL); Robert Jacob Pet, Waalre (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/766,845

(22) PCT Filed: Oct. 6, 2020

(86) PCT No.: PCT/EP2020/077909
§ 371 (c)(1),
(2) Date: Apr. 6, 2022

(87) PCT Pub. No.: WO2021/073930
PCT Pub. Date: Apr. 22, 2021

(65) Prior Publication Data

US 2024/0060612 A1 Feb. 22, 2024

(30) Foreign Application Priority Data

Oct. 16, 2019 (EP) .................................... 19203452

(51) Int. Cl.

*F21S 10/04* (2006.01)
*F21K 9/64* (2016.01)
*F21Y 115/10* (2016.01)

(52) U.S. Cl.

CPC ................ *F21S 10/04* (2013.01); *F21K 9/64* (2016.08); *F21Y 2115/10* (2016.08)

(58) Field of Classification Search

CPC ............ F21W 2121/00; F21Y 2105/10; F21Y 115/10; F21S 6/001; F21S 10/04; Y10S 362/81; F21K 9/64

See application file for complete search history.

(56) References Cited

U.S. PATENT DOCUMENTS 6,053,622 A * 4/2000 Horowitz .............. F21S 10/043 362/802
10,907,787 B2 * 2/2021 Ostrander ............ H05B 47/165

(Continued)

FOREIGN PATENT DOCUMENTS

CN 203850336 U 9/2014
CN 106678730 A 5/2017

(Continued)

*Primary Examiner* — William J Carter

(57) ABSTRACT

A light emitting diode, LED, filament lamp (100), comprising at least one LED filament (120, 120*a*, 120*b*) having abase portion (210) and a top portion (22) extending over a length, L, along a longitudinal axis, A, wherein the LED filament comprises an array of a plurality of light emitting diodes, LEDs, (140) extending along the longitudinal axis A. An encapsulant (145) at least partially enclosing the plurality of LEDs, wherein the encapsulant comprises a luminescent material (150). The linear array of LEDs (140) comprising a plurality N of blue LEDs (106) emitting blue light and a plurality of M red LEDs (107) emitting red light, the linear array of LEDs (140) comprising a density of blue LEDs and a density of red LEDs, The density of blue LEDs decreases and/or the density of red LEDs increases from the base portion (210) to the top portion (220) along at least a portion of the length (L), whereby the color temperature, $CT_L$, of the light emitted from the at least one LED filament decreases from the base portion (210) to the top portion (220) over at least a portion of the length of the at least one LED filament.

14 Claims, 8 Drawing Sheets

(56) References Cited

U.S. PATENT DOCUMENTS

| | | | | |
|---|---|---|---|---|
| 2003/0072154 | A1* | 4/2003 | Moore | H05B 45/44 362/234 |
| 2005/0196716 | A1* | 9/2005 | Haab | F21S 10/043 431/126 |
| 2005/0254248 | A1* | 11/2005 | Lederer | H05B 45/20 362/392 |
| 2007/0236947 | A1* | 10/2007 | Jensen | F21S 6/001 362/392 |
| 2014/0254148 | A1* | 9/2014 | Fournier | F21S 10/04 362/235 |
| 2015/0369431 | A1* | 12/2015 | Li | H05B 45/00 362/249.1 |
| 2016/0057829 | A1* | 2/2016 | Li | F21V 23/06 315/313 |

FOREIGN PATENT DOCUMENTS

| | | | |
|---|---|---|---|
| GB | 255438 | A | 2/1927 |
| KR | 200454260 | Y1 | 6/2011 |
| WO | 2016145450 | A1 | 9/2016 |
| WO | 2018055386 | A1 | 3/2018 |
| WO | 2019197394 | A1 | 10/2019 |

* cited by examiner

LED FILAMENT LAMP OF CANDLE LIGHT APPEARANCE

CROSS-REFERENCE TO PRIOR APPLICATIONS

This application is the U.S. National Phase application under 35 U.S.C. § 371 of International Application No. PCT/EP2020/077909, filed on Oct. 6, 2020, which claims the benefit of European Patent Application No. 19203452.8, filed on Oct. 16, 2019. These applications are hereby incorporated by reference herein.

FIELD OF THE INVENTION

The present invention generally relates to lighting arrangements comprising one or more light emitting diodes. More specifically, the lighting arrangement is related to a light emitting diode (LED) filament lamp configured to provide an appearance of a candle light during operation of the LED filament lamp.

BACKGROUND OF THE INVENTION

The use of light emitting diodes (LED) for illumination purposes continues to attract attention. Compared to incandescent lamps, fluorescent lamps, neon tube lamps, etc., LEDs provide numerous advantages such as a longer operational life, a reduced power consumption, and an increased efficiency related to the ratio between light energy and heat energy. However, the light generated by LED lamps as well as incandescent lamps may, for some applications, appear static, "cold" and/or unattractive.

Candles, on the other hand, are able to generate light which is highly attractive and appealing. Light emitted from the open flame of a candle may, compared to light emitted from LEDs and/or incandescent lamps, appear more vivid, "warm", aesthetic and/or romantic. However, one of the major disadvantages of the use of candles is the risk of fire associated with an open flame.

Hence, it is an object of the present invention to try to overcome the respective disadvantages of candles, on the one hand, and light emitted from LEDs, on the other hand, by exploring the possibility of combing one or more of the respective advantages of candle light and LED lighting devices.

In CN 106678730 a filament is disclosed with two parallel positioned arrays of LEDs that can be individually controlled. The two arrays of LEDs are of different color and therewith the color temperature of the filament can be controlled.

SUMMARY OF THE INVENTION

Hence, it is of interest to explore the possibility of combining one or more of the numerous advantages of LED lighting devices with the attractiveness and the appealing properties of light emitted from a candle.

This and other objects are achieved by providing a LED filament lamp having the features in the independent claim. Preferred embodiments are defined in the dependent claims.

Hence, according to the present invention, there is provided a light emitting diode, LED, filament lamp, comprising at least one LED filament having a base portion and a top portion extending over a length, L, along a longitudinal axis, A. The LED filament comprises an array of a plurality of LEDs, extending along the longitudinal axis A, and an encapsulant at least partially enclosing the plurality of LEDs, wherein the encapsulant comprises a luminescent material. In case, the LED filament is either curved or flexible, the longitudinal axis is to be interpreted as following the array of LEDs in the filament. The linear array of LEDs comprises a plurality N of blue LEDs emitting blue light and a plurality of M red LEDs emitting red light, such that the linear array of LEDs comprises a density of blue LEDs and a density of red LEDs, wherein the density of blue LEDs decreases and/or the density of red LEDs increases from the base portion to the top portion along at least a portion of the length (L). As a consequence, the color temperature, $CT_L$, of the light emitted from the at least one LED filament decreases from the base portion to the top portion over at least a portion of the length of the at least one LED filament.

Thus, the present invention is based on the idea of providing a LED filament lamp wherein the appearance of the LED filament(s) of the LED filament lamp and/or the light emitted from the LED filament lamp during its operation may resemble or mimic that of a candle. Furthermore, by the features of the LED filament lamp, the lamp is furthermore able to combine one or more of the numerous advantages of LED lighting devices with the attractiveness and the appealing properties of light emitted from a candle.

The present invention is advantageous in that properties of the LED filament(s) of the LED filament lamp may lead to a generation of light which may resemble or mimic the relatively vivid, "warm", aesthetic and/or romantic light of an open flame of a candle.

The present invention is further advantageous in that the LED filament lamp may combine the aesthetic features of candle light with the incontestable safety of operating an electric light compared to that of a light source having an open flame.

The present invention is further advantageous in that the LED filament lamp has a much longer operational life compared to that of a candle. Hence, it is much more convenient and/or cost-efficient to operate a LED filament lamp instead of a candle.

It will be appreciated that the LED filament lamp of the present invention furthermore comprises relatively few components. The low number of components is advantageous in that the LED filament lamp is relatively inexpensive to fabricate. Moreover, the low number of components of the LED filament lamp implies an easier recycling, especially compared to devices or arrangements comprising a relatively high number of components which impede an easy disassembling and/or recycling operation.

The LED filament lamp comprises at least one LED filament. The at least one LED filament, in its turn, comprises an array of LEDs. By the term "array", it is here meant a linear arrangement or chain of LEDs, or the like, arranged on the LED filament(s). Under linear arrangement it is understood that the LEDs are connected in a linear way, this does not mean that the LEDs are arranged in a one dimensional array on the substrate; deviating forms may occur, like e.g. an array having a width of two LEDs (as shown in FIG. 13*b*). The LEDs may furthermore be arranged, mounted and/or mechanically coupled on/to a substrate of each LED filament, wherein the substrate is configured to support the LEDs. The LED filament(s) further comprises an encapsulant at least partially enclosing the plurality of LEDs. By the term "encapsulant", it is here meant a material, element, arrangement, or the like, which is configured or arranged to at least partially surround, encapsulate and/or enclose the plurality of LEDs of the LED filament(s). The encapsulant comprises a luminescent material. By the term "luminescent material", it is here meant a material, composition and/or substance which is configured to emit light under external energy excitation. For example, the luminescent material may comprise a fluorescent material.

It is the insight of the present invention that when the array of LEDs comprises relatively more blue LEDs at the base portion than at the top portion, or when the array of LEDs comprises relatively more red LEDs at the top portion than at the base portion.

Consequently, the color temperature of the light emitted from the at least one LED filament may decrease in a direction from the base portion to the top portion at least along the portion of the LED filament. The present embodiment is advantageous in that the decrease of the color temperature of the light emitted from the LED filament(s) may resemble that of a candle light.

This objective can be realized by an array of LEDs with a sequence of blue (B) and red (R) LEDs, which sequence has at the base portion relatively more blue LEDs (B) than at the top portion, or alternatively, at the top portion relatively more red LEDs (R) than at the base portion. For instance, the sequence of the LEDs on a filament—as seen from base portion to top portion—may be: B-B-B-R-B-B-R-B-R-B-R-B . . . , here the number of blue LEDs diminishes and after each section with blue LEDs there is one red LED, so from base portion to top portion, the emitted light will become more reddish showing a lower color temperature.

Each block of a certain number of blue and red LEDs, until the next blue LED is referred to as sub-sequence. The example given above starts with the sub-sequence B-B-B-R, followed by the sub-sequence B-B-R, then B-R, B-R, B . . . . The same holds when the sequence of LEDs starts with a red LED at the bottom portion; in that case a sub-sequence is a block of a certain number of red and blue LEDs, until the next red LED.

As an alternative, with the same result, the sequence can read e.g. B-B-B-R-B-B-B-R-R-B-B-B-R-R-R-, Many more arrangements of the red and blue LEDs are possible, as long as they are arranged in such a way that a gradual decrease of color point is realized from the base portion to the top portion of the LED filament.

The word gradual in the context of the present invention should be interpreted that the color emitted from the LED filament changes in a smooth and natural way from more blueish to more reddish when going from the bottom portion to the top portion. This effect is observed at some distance from the LED filament when the light of the individual LEDs is mixed—for instance by the use of a diffusing layer on the encapsulant—is such a way that the individual colors of the LEDs are not predominantly observable.

Some more arrangements of the sequence of the LEDs on the LED filament according to the invention are given in Table 1. The LEDs may form a subset of LED of the total set of LEDs in the linear array of LEDs according to one or more of the following examples.

TABLE 1 red LED (R) and blue LED (B) sequences in a subset of LEDs:

| | LED position | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Example 1 | B | B | R | B | R | | | | | | | | |
| Example 2 | B | R | B | R | R | | | | | | | | |
| Example 3 | B | B | R | B | R | R | | | | | | | |
| Example 4 | B | B | B | R | B | B | R | | | | | | |
| Example 5 | B | R | R | B | R | R | R | | | | | | |
| Example 6 | B | B | R | B | R | B | R | R | | | | | |
| Example 7 | B | R | B | R | R | B | R | R | R | | | | |
| Example 8 | B | B | B | R | B | B | R | B | R | | | | |
| Example 9 | B | R | B | R | R | B | R | R | R | | | | |
| Example 10 | B | B | B | R | B | B | R | R | B | R | R | R | |
| Example 11 | B | B | B | R | R | B | B | R | R | B | R | R | |
| Example 12 | B | B | R | B | B | R | R | B | B | R | R | R | |

In an embodiment of the invention the number of neighboring LEDs with the same annotation is less or equal to 4 (i.e. maximum 4 neighboring blue LEDs B and maximum 4 neighboring red LEDs R).

In an embodiment of the invention the linear array of LEDs comprises at least one blue LED neighbored on both sides by red LEDs (i.e. -R-B-R-), at least one sequence of two blue LEDs neighbored on both sides by red LEDs (i.e. -R-B-B-R-), and at least one sequence of three blue LEDs neighbored on both sides by red LEDs (i.e. -R-B-B-B-R-).

In an embodiment of the invention the linear array of LEDs comprises at least one red LED neighbored on both sides by blue LEDs (i.e. -B-R-B-), at least one sequence of two red LEDs neighbored on both sides by blue LEDs (i.e. -B-R-R-B-), and at least one sequence of three red LEDs neighbored on both sides by blue LEDs (i.e. -B-R-R-R-B-).

According to an embodiment of the present invention, a first section of the at least one LED filament is defined between the base portion and an intermediate portion of the at least one LED filament. A second section of the at least one LED filament is defined between the intermediate portion and the top portion of the at least one LED filament. At least one of the density of the blue LEDs decreases and the density of the red LEDs increases along the first section and may remain constant along the second section. Consequently, the color temperature of the light emitted from the at least one LED filament may decrease along the first section in a direction from the base portion to the intermediate portion, and may remain constant along the second section. Hence, the light emitted from the LED filament(s) has a relatively high color temperature, although decreasing, between the base portion and the intermediate portion of the LED filament(s). In relation, the light emitted from the LED filament(s) has a lower, constant color temperature between the intermediate portion and the top portion of the LED filament(s). The present embodiment is advantageous in that the LED filament(s) hereby may, to an even further extent, mimic or resemble the light emitted from an open flame.

According to an embodiment of the present invention, the first section of the at least one LED filament may be shorter than the second section of the at least one LED filament. It will be appreciated that the LED filament(s) may mimic the appearance and/or properties of a wick of a candle. The present embodiment is advantageous in that the configuration may even further contribute to the generation of light from the LED filament lamp which may resemble that of candle light.

According to an embodiment of the present invention, in the LED filament lamp the LEDs in the array of LEDs are separated by a certain distance, the pitch, and in this embodiment they are arranged at a constant pitch P. Therewith, the differences in the density of the blue and/or red LEDs will be realized by changing the relative number of red and blue LEDs in order to obtain a decreasing color temperature from the base portion to the top portion.

As an alternative embodiment of the present invention the LEDs in the array of LEDs (140) having a pitch P wherein said pitch increases for the blue LEDs and/or decrease for the red LEDs from the base portion to the top portion over at least a portion of the length of the at least one LED filament. I this embodiment the differences in the density of for instance the Blue LEDs is realized by increasing the pitch of the blue LEDs from the base portion to the top portion, therewith reducing the amount of blue light emitting from the LED filament and as a consequence the color temperature will decrease.

The same effect can be realized by decreasing the pitch of the red LEDs when going from base portion to top portion. This leads to a higher red-light output towards the top portion and as a consequence a lower color temperature.

Additionally, in case the pitch of the blue and/or red LEDs is varied over the length of the filament, it may be necessary to adapt the drive current to the blue and red LEDs in order to keep the overall light output on the same level.

According to an embodiment of the present invention, the LED filament the number of blue LEDs N is at least 10, and also the number of red LEDs M is at least 10. With these numbers of LEDs their mutual spacing (pitch) is small enough to realize a smooth light distribution over the filament. Even more preferred is a LED filament in which the number of blue LEDs is larger than 1.3 times the number of red LEDs. This ratio between blue and red light emitting LEDs enables a preferred color temperature distribution for mimicking the desired a candle type of lamp.

In a further embodiment, the LED filament lamp is provided with a luminescent material that converts at least a part of the blue light into converted light, preferably said converted light is green and/or yellow light. This enables the realization of a candle type of filament lamp with a more natural color impression.

According to an embodiment of the present invention, the LED filament lamp may further comprise a diffusor element. The diffusor element may at least partially enclose the at least one filament and be arranged to diffuse the light emitted from the at least one filament. By the term "diffusor element", it is here meant a diffusing layer and/or an element which possesses properties for diffusing light. For example, the "diffusor element" may be a light guide which is translucent e.g. by surface roughness or scattering.

The present embodiment is advantageous in that the diffusor element may contribute to an emission of light from the LED filament lamp which, to an even further extent, may resemble that of a candle.

According to an embodiment of the present invention, the LED filament lamp may further comprise a control unit coupled to the at least one LED filament and be configured to control the power supply of the at least one LED filament. By the term "control unit" it is hereby meant a device, arrangement, element, or the like, which is configured to control the power supply to the LED filament(s). It will be appreciated that the control of the control unit furthermore may be performed according to one or more predetermined settings. By the term "predetermined setting", it is hereby meant a setting, setup, program, relationship, or the like, which is set or determined in advance. The control unit may hereby control the power supply, and consequently, the color temperature of the light emitted from the LED filament(s) as a function of this or these predetermined setting(s).

In a further example, the control unit may be configured to individually control an operation of each LED of the plurality of LEDs.

According to an embodiment of the present invention, the LED filament lamp may comprise at least two LED filaments, wherein the control unit may be configured to individually control the power supply to the at least two LED filaments and to individually control the operation of each LED of the plurality of LEDs of each LED filament. The present embodiment is advantageous in that the control unit may operate the power supply to the LED filaments and control the operation of each LED such that an even more "vivid" light is emitted from the LED filaments, which may resemble light from an open flame candle.

According to an example of the present invention, the LED filament lamp may comprise at least two LED filaments arranged in parallel along the longitudinal axis. The present embodiment is advantageous in that the present arrangement of LED filaments may, to an even further extent, lead to an emission of light from the LED filaments which may have appearance and the aesthetically appealing properties of candle light.

According to an example of the present invention, the LED filament lamp may comprise three LED filaments arranged in parallel along the longitudinal axis. The three LED filaments may further be grouped such that in a cross-section, parallel to the transverse axis, each LED filament is arranged on a respective corner of a triangle.

According to an example of the present invention, the LED filament lamp may comprise at least two LED filaments, wherein the lengths of at least two of the at least two LED filaments may differ from each other. The present embodiment is advantageous in that the arrangement of LED filaments as exemplified may lead to an emission of light from the LED filaments which may resemble candle light.

According to an example of the present invention, the LED filament lamp may comprise at least two LED filaments, wherein at least two of the at least two LED filaments may be shifted with respect to each other along the longitudinal axis. In other words, the plurality of LED filaments, arranged in a parallel, may be shifted with respect to each other.

According to an embodiment of the present invention, the LED filament lamp may comprise at least two LED filaments. The color temperature $CT_{L1}$ of the light emitted from the at least one first LED filament may differ, at least along a portion thereof along the longitudinal axis, from the color temperature $CT_{L2}$ of the light emitted from the at least one second LED filament. The present embodiment is advantageous in that the ability of the LED filament lamp to vary the color temperature with respect to different LED filaments may contribute to the appearance and the aesthetically appealing properties of candle light.

According to an embodiment of the present invention, the color temperature of the light emitted from the at least one LED filament may vary along the length of the at least one LED filament in the range of 5000 K to 1500 K, more preferably 4000 K to 1700 K, and most preferred 2700 K to 1900 K. In combination herewith, or according to another embodiment of the present invention, the color rendering index of the light emitted from the LED filament lamp may be at least 70, preferably at least 75, and even more preferred 80.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
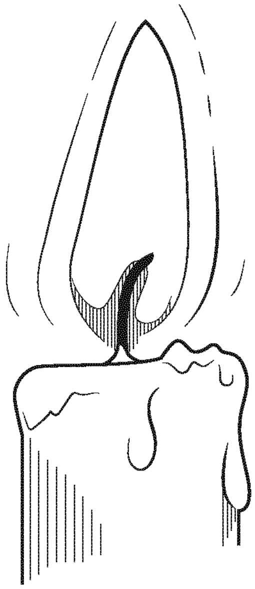
FIG. 1 shows a candle according to the prior art.

FIG. 1 shows a candle according to the prior art. Candles, having an open flame, are able to generate light which is highly attractive and appealing. Light emitted from the open flame of a candle may, compared to LED and/or incandescent lamps, appear vivid, "warm", aesthetic and/or romantic. However, one of the major disadvantages of the use of candles is the risk of fire associated with an open flame. Therefore, it is an object of the present invention to try to explore the possibility of combing one or more of the respective advantages of candles and LED lighting devices.

Figure 2A:
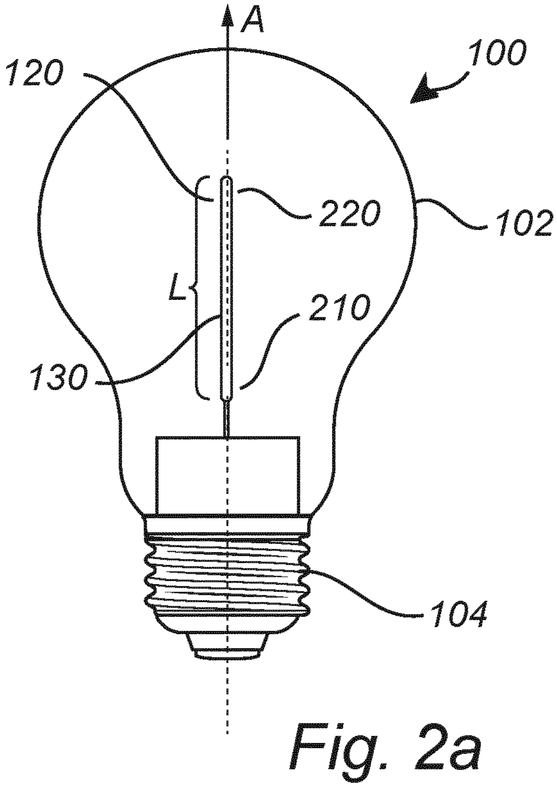
FIG. 2*a* shows a light emitting diode, LED, filament lamp according to an exemplifying embodiment of the present invention.
Figure 2B:
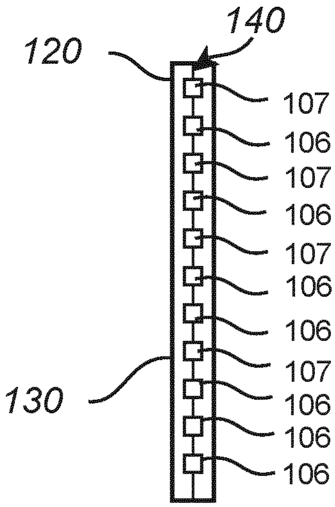
FIG. 2*b* shows a portion of a LED filament lamp according to an exemplifying embodiment of the present invention, FIG. 3 show a cross section of an LED filament according to exemplifying embodiments of the present invention, FIGS. 4*a-c* schematically show the color temperature of the light emitted from at least one LED filament of a LED filament lamp according to exemplifying embodiments of the present invention.

FIG. 2*a* shows a light emitting diode, LED, filament lamp 100 according to an exemplifying embodiment of the present invention. The LED filament lamp 100 is exemplified as a bulb-shaped lamp extending along a longitudinal axis A of the LED filament lamp 100. The LED filament lamp 100 further comprises a transparent or diffusing (e.g. translucent) envelope 102, which preferably is made of glass. The LED filament lamp 100 further comprises a threaded cap 104 which is connected to the envelope 102. The LED filament lamp 100 further comprises a LED filament 120 extending over a length L along the longitudinal axis A. The LED filament 120, according to this example, extends along the longitudinal axis A of the LED filament lamp 100, and the LED filament 120 comprises a base portion 210 and a top portion 220. The LED filament 120, in its turn, comprises an array or "chain" of LEDs 140 which is arranged on the LED filament 120 as shown in FIG. 2*b*. For example, the array or "chain" of LEDs 140 may comprise a plurality of adjacently arranged LEDs 140 wherein a respective wiring is provided between each pair of LEDs 140. The plurality of LEDs 140 preferably comprises more than 5 LEDs, more preferably more than 8 LEDs, and even more preferred more than 10 LEDs. The plurality of LEDs 140 may be direct emitting LEDs which provide a color. The LEDs 140 are preferably a sequence of blue LEDs and red LEDs The LEDs 140 may have a specific pattern, for example comprising alternating blue and red light LEDs. It will be appreciated that more blue light LEDs than red light LEDs may be used to achieve the desired color temperature to mimic candle light (e.g. in a LED array of blue-blue-red-blue-blue-red, etc.). in order to realize a filament with a decreasing color temperature from base portion to top portion, there must be a decrease in blue light or an increase in red light LEDs as a function of the length of the LED filament 120 from its base portion to its top portion (e.g. in a LED array of blue-blue-blue-red-blue-blue-red-blue-red, etc.).

The LED filament 120 further comprises a substrate 130*a* of elongated shape for supporting the plurality of LEDs 140. For example, the plurality of LEDs 140 may be arranged, mounted and/or mechanically coupled to the substrate 130. The LED filament 120 further comprises an encapsulant (shown in FIG. 3*a*) which at least partially encloses the plurality of LEDs 140. The encapsulant may fully enclose the plurality of LEDs 140. Furthermore, the encapsulant may at least partly enclose the plurality of LEDs and the substrate 130.

The encapsulant comprises a luminescent material. For example, the luminescent material may comprise a fluorescent material, an inorganic phosphor, an organic phosphor, and/or quantum dots/rods. The encapsulant may furthermore, or alternatively, comprise a polymer material, for example a silicone.

Figure 3:
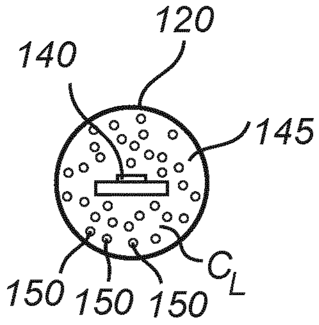
Figure 5:
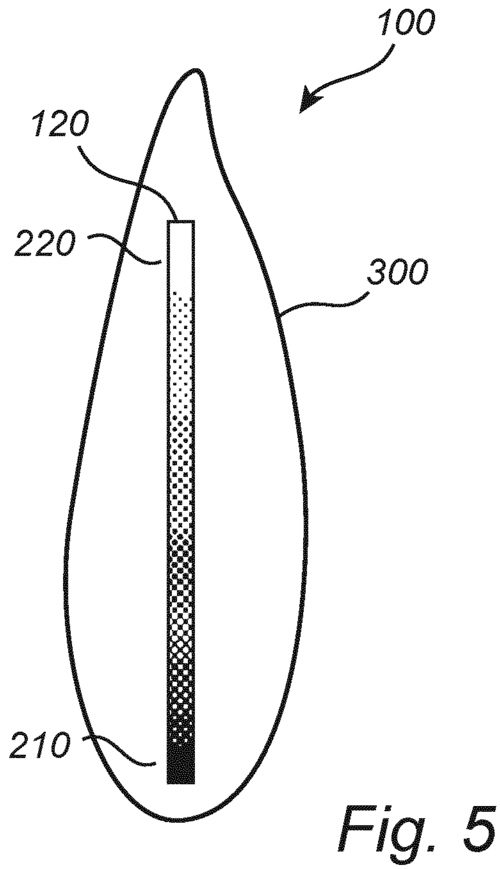
FIGS. 5-10 show examples of portions of LED filament lamps according to exemplifying embodiments of the present invention.

FIG. 3 schematically shows the cross-section of a LED filament 120 extending along the longitudinal axis A of the LED filament lamp 100, for example as shown in FIG. 2*a* and/or FIG. 5. The encapsulant 145 of the LED filament 120, which encapsulant 145 comprises the luminescent material 150, encloses the plurality of LEDs 140. By way of example, the LED filament comprises a sequence of blue LEDs 106 and red LEDs 107. Here, the encapsulant 145 may be exemplified as a glue which encloses or surrounds the plurality of LEDs 140.

Figure 4A:
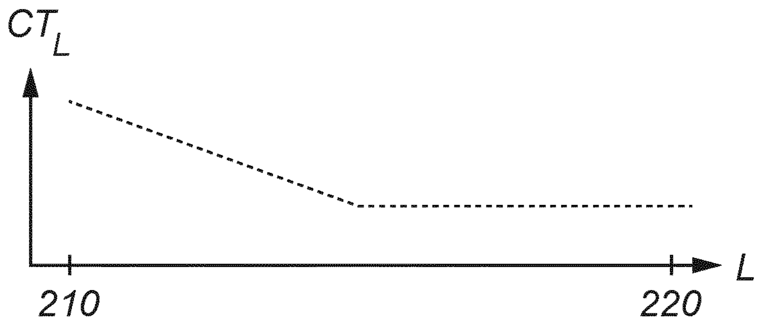
Figure 4B:
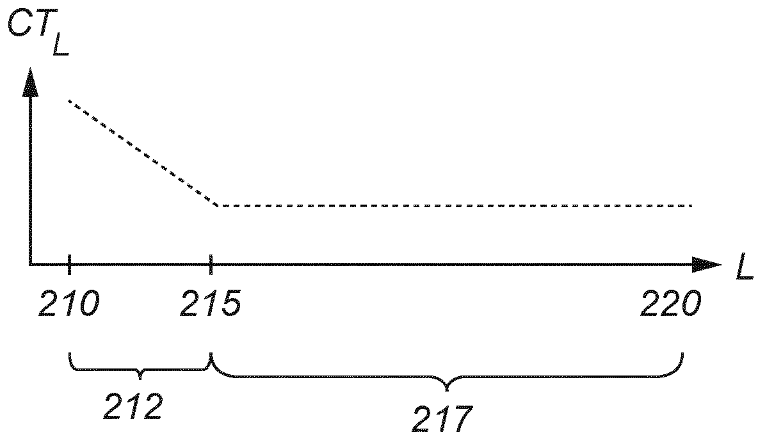
Figure 4C:
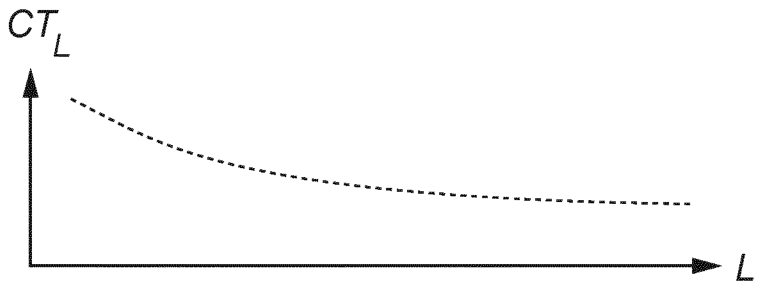

FIGS. 4*a-c* schematically show the color temperature $CT_L$ of the light emitted from the at least one filament of the LED filament lamp according to exemplifying embodiments of the present invention. Common to all FIGS. 4*a-c* is that the x-axis represents the length L of the at least one LED filament along its longitudinal axis A, in a direction from a base portion to a top portion of the LED filament 120, and the y-axis represents the color temperature $CT_L$ as a function of the length L.

In FIG. 4*a*, the color temperature $CT_L$ of the light emitted from the at least one LED filament decreases along its length L along the longitudinal axis A thereof. In other words, at a base portion 210 of the LED filament(s), the color temperature $CT_L$ is relatively high, whereas the color temperature $CT_L$ decreases along the length L of the LED filament(s) towards a top portion 220 of the LED filament(s).

In FIG. 4*b*, the color temperature $CT_L$ of the light emitted from the at least one LED filament decreases along a first section 212 of the LED filament(s), wherein the first section 212 is defined between a base portion 210 and an intermediate portion 215 of the at least one LED filament. The color temperature $CT_L$ thereafter remains constant along a second section 217 of the LED filament(s), wherein the second section 217 is defined between the intermediate portion 215 and a top portion 220 of the LED filament(s). The decrease of the color temperature $CT_L$ as indicated in the left-most portion of FIG. 4*b* The constant color temperature $CT_L$ as indicated in the right-most portion of FIG. 4*b* indicates that the density of blue and red LEDs is constant at this second section 217, for instance by applying the same number of red and blue LEDs in the alternating sequence of LEDs. Hence, at a base portion 210 of the filament, the color temperature $CT_L$ of the light emitted from the LED filament(s) is relatively high, whereas the color temperature $CT_L$ decreases along the length L of the LED filament(s) towards a top portion 220 of the LED filament(s). It will be appreciated that even though the decrease of the color temperature $CT_L$ is exemplified as non-linear, the decrease may also be linear. Thereafter, along the second section 217 of the LED filament(s), the color temperature $CT_L$ remains substantially constant.

In FIG. 4*c*, the color temperature $CT_L$ of the light emitted from the at least one LED filament decreases according to a negative exponential curve as a function of the length L of the LED filament. Similarly to FIG. 4*b*, the first section of the LED filament is shorter than the second section of the LED filament.

Analogously, in the FIG. 4*a*-4*c* the color temperature of the LED filament may increase from the base portion to the top portion of the LED filament.

Regarding one or more of the embodiments of FIGS. 4*a*-*c*, the light emitted from the LED filament(s) may vary along the length of the LED filament(s) in the range of 5000 K to 1500 K, more preferably 4000 K to 1700 K, and most preferred 2700 K to 1900 K. The gradual increase or decrease of the color temperature of the LED filament(s) along its length may be at least 300 K. Furthermore, the color rendering index, CRI, of the light emitted from the LED filament lamp may be at least 70, preferably at least 75, and even more preferred 80.

FIGS. 5-10 show examples of portions of LED filament lamps according to exemplifying embodiments of the present invention. Common to all FIGS. 5-10 is that the portions and/or configurations of the LED filament lamps are arranged to mimic candle light. It will be appreciated that combinations of two or more of the shown embodiments are feasible.

FIG. 5 shows an exemplifying embodiment of a portion of a LED filament lamp 100. Analogously with the example of FIG. 2*a*, the LED filament lamp 100 comprises a LED filament 120 which has a base portion 210 to a top portion 220. The LED filament lamp 100 further comprises a diffusor element 300 which at least partially encloses the LED filament(s) 120 of the LED filament lamp 100. The diffusor element 300 is arranged to diffuse at least a portion of the light emitted from the LED filament(s) 120. The LED filament lamp 100 may further comprise a control unit (not shown) which is coupled to the LED filament(s) 120. The control unit may be configured to control the power supply to the LED filament(s) 120 and may be configured to individually control the operation of the plurality of LEDs of the LED filament(s) 120.

Figure 6:
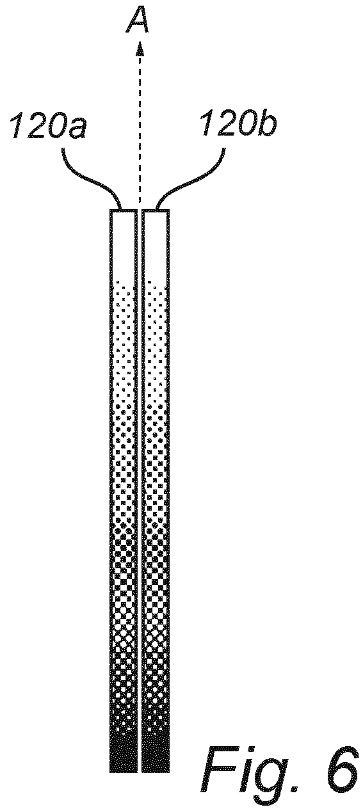

FIG. 6 shows an exemplifying embodiment of a portion of a LED filament lamp. The LED filament lamp comprises two LED filaments 120*a*, 120*b* which are arranged in parallel along the longitudinal axis A. It will be appreciated that the LED filament lamp may comprise even more LED filaments arranged in parallel. Furthermore, the term "parallel" may, alternatively, be construed as "essentially parallel". Hence, the two LED filaments 120*a*, 120*b* may be oriented in a mutually angled position, wherein the angle between the two LED filaments 120*a*, 120*b* may be 0-20°.

Figure 7:
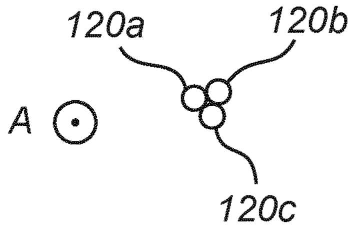

FIG. 7 shows yet another exemplifying embodiment of a portion of a LED filament lamp. The LED filament lamp comprises three LED filaments 120*a*-*c* which are arranged in parallel along the longitudinal axis A. Analogously with the example of FIG. 6, the three LED filaments 120*a*-*c* may be oriented in a mutually angled position, wherein the angle between the three LED filaments 120*a*-*c* may be 0-20°. The three LED filaments 120*a*-*c* are furthermore grouped such that in a cross-section, parallel to the transverse axis, B, each LED filament 120*a*-*c* is arranged on a respective corner of a triangle.

Figure 8:
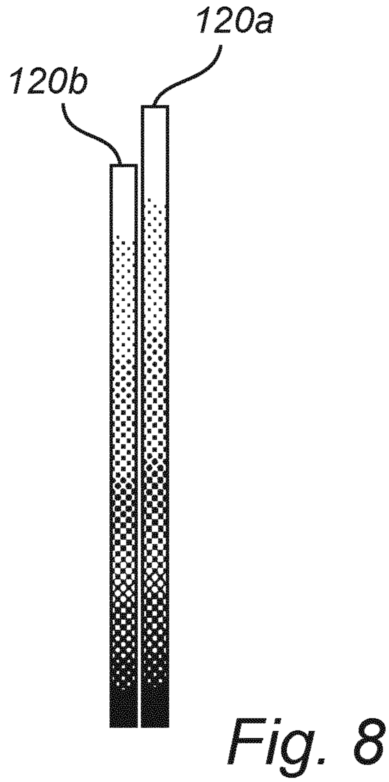

In FIG. 8, a portion of a LED filament lamp as exemplified comprises two LED filaments 120*a*, 120*b*. The lengths of the two LED filaments 120*a*, 120*b* differ from each other in that the LED filament 120*a* is longer than the LED filament 120*b*. Although FIG. 8 show two LED filaments 120*a*, 120*b*, it should be noted that the LED filament lamp may comprise even more LED filaments, of which at least two differ in length.

Figure 9:
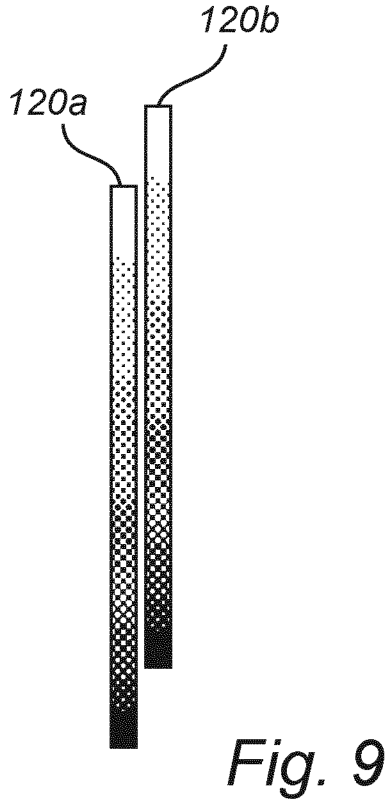

FIG. 9 shows yet another exemplifying embodiment of a portion of a LED filament lamp 100. The LED filament lamp 100 comprises two LED filaments 120*a*, 120*b*. The LED filaments 120*a*, 120*b* are shifted with respect to each other along the longitudinal axis A.

Figure 10:
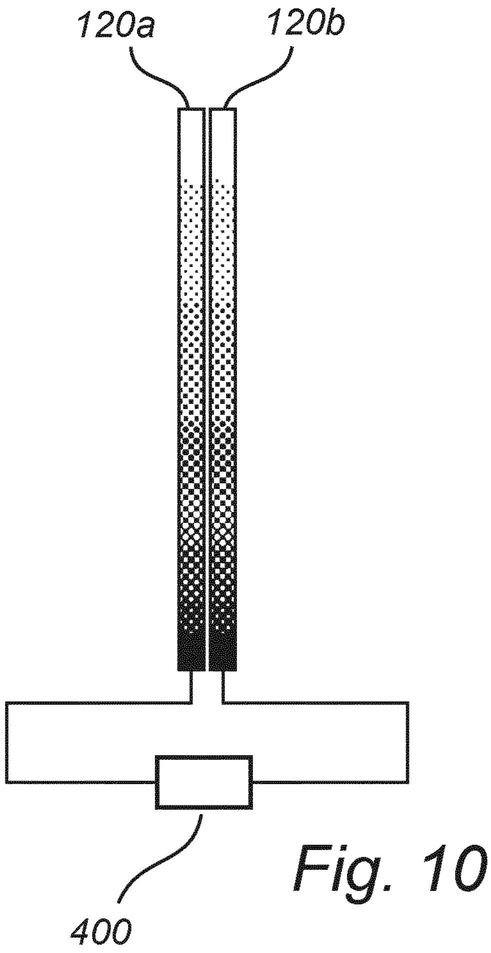

FIG. 10 shows yet another exemplifying embodiment of portion of a LED filament lamp. The LED filament lamp further comprises a schematically indicated control unit 400 which is coupled to a pair of LED filaments 120*a*, 120*b*. The control unit 400 is configured to control the power supply to the pair of LED filaments 120*a*, 120*b*.

Figure 11:
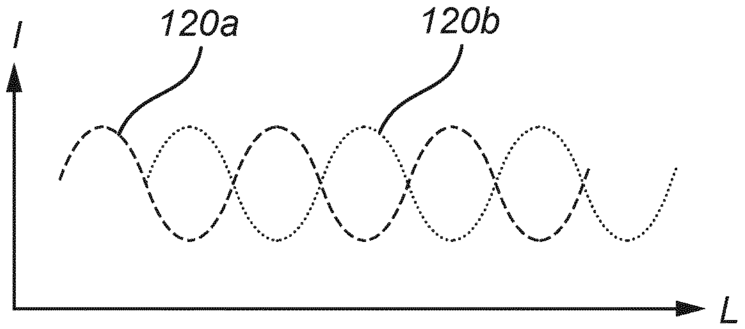
FIG. 11 shows a power supply to at least one LED filament of a LED filament lamp.

FIG. 11 shows a power supply I to at least one LED filament of a LED filament lamp, e.g. to the pair of LED filaments 120*a*, 120*b* as shown in FIG. 10. The control unit is configured to control the power supply I of the two LED filaments 120*a*, 120*b* individually as a function of time and/or length of the LED filament L. As exemplified in FIG. 11, the control unit may control a phase shift of 180° of the power supply I between the LED filaments 120*a*, 120*b*. The obtained effect is that different light effects (i.e. color temperature effects) can be achieved which mimic candle light.

The person skilled in the art realizes that the present invention by no means is limited to the preferred embodiments described above. On the contrary, many modifications and variations are possible within the scope of the appended claims. For example, one or more of the LED filament(s) 120, etc., may have different shapes, dimensions and/or sizes than those depicted/described.

Figure 12A:
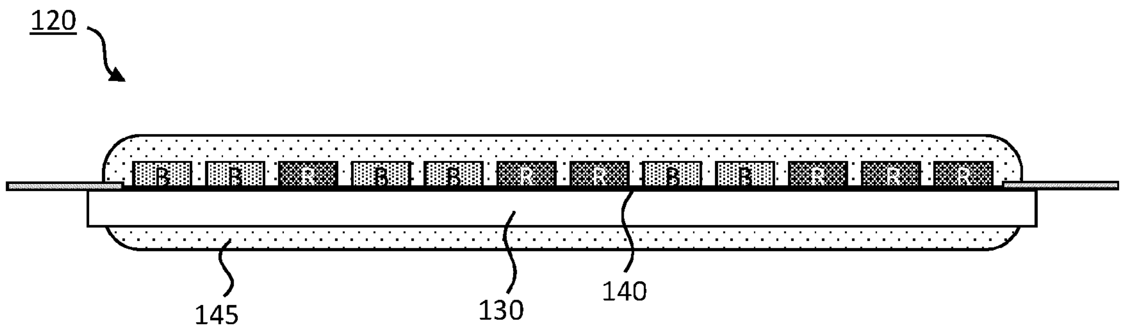
FIGS. 12*a-c* show exemplifying embodiments of various arrangements of sequences of the LEDs of the LED filament lamp.
Figure 12B:
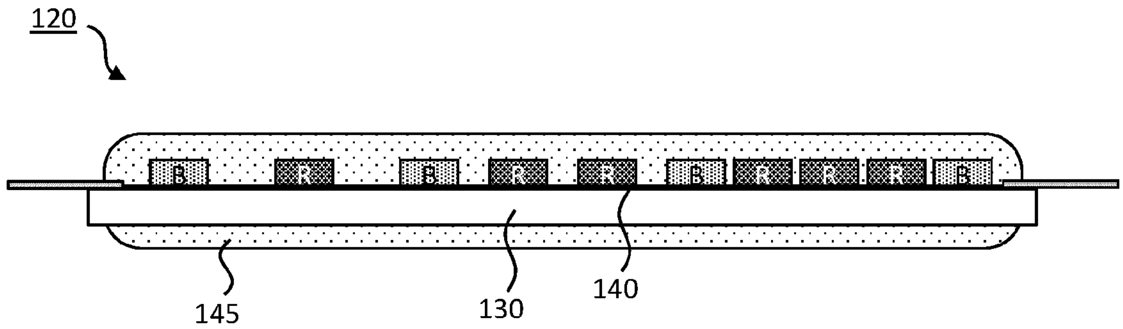
Figure 12C:
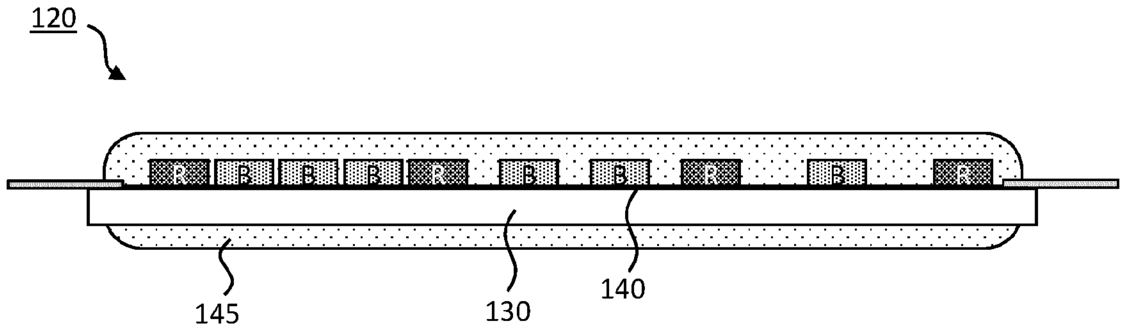

In the FIGS. 12*a-c* embodiments are given showing various arrangements of sequences of LEDs in the LED filament lamp according to the invention. These arrangements all fulfill the condition that going from the bottom portion to the top portion—that is in Table 1 in the direction from LED position 1 to LED position 5 to 12, depending to the Example—the color temperature will gradually decrease over at least a portion of the length of the at least one LED filament.

In FIG. 12*a* the decrease in color temperature is realized by an increase in red LED density and a decrease in blue LED density. In this embodiment the LEDs are positioned at a constant pitch. The obtained effect is easy placement of LEDs and homogenous LED lighting along the length of the LED filament.

In FIG. 12*b* the decrease in color temperature is realized by an increase in red LED density, while having a constant blue LED density. In this embodiment the pitch is not constant, but the obtained effect is an improved flame look, by emphasizing the red part of the flame.

In FIG. 12*c* the decrease in color temperature is realized by a constant red LED density, while having a decrease in blue LED density. Here, the blue/yellow part of the flame is emphasized and this also renders an improved flame look.

Figure 13A:
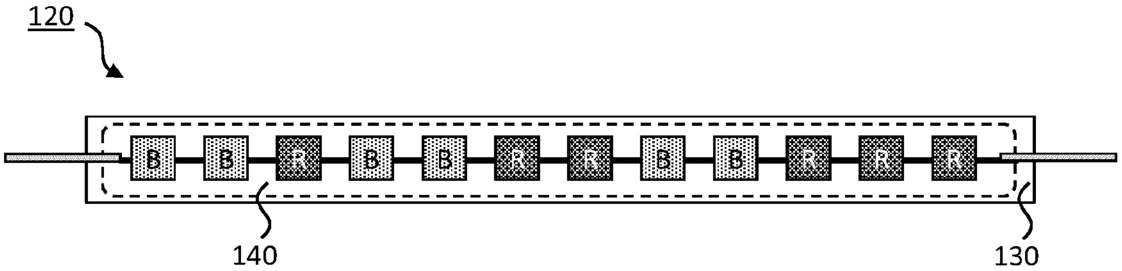
FIGS. 13*a-b* show exemplifying embodiments of various arrangements of linear LED arrays of the LED filament lamp.
Figure 13B:
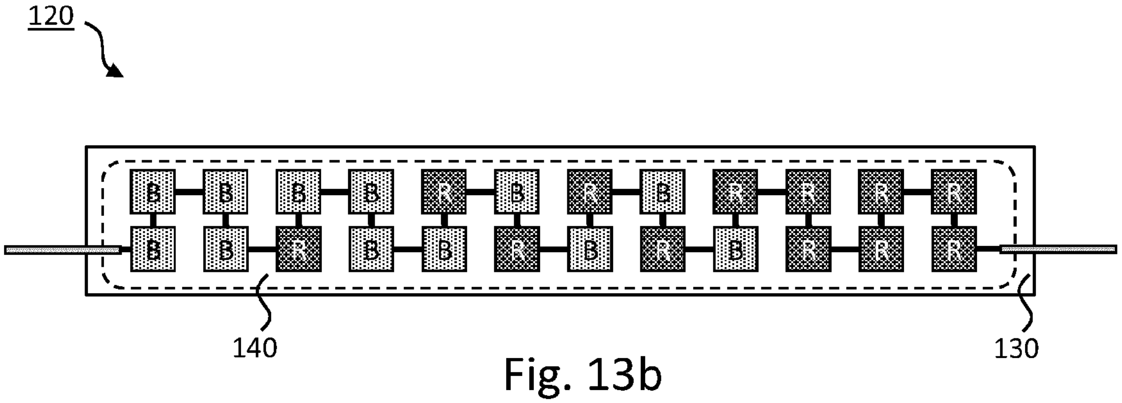

Finally, in FIGS. 13*a* and 13*b* two examples are given of a linear array. In FIG. 13*a* the array having a length of X LEDs and a width of 1 LED.; FIG. 13*b* shows an array of length X and a width of 2 LEDs. This latter array is by virtue of its wiring still considered a linear array, although not one-dimensional.

The invention claimed is:

1. A light emitting diode, LED, filament lamp, comprising at least one LED filament having a base portion and a top portion extending over a length, L, along a longitudinal axis, A, wherein the LED filament comprises an array of a plurality of light emitting diodes, LEDs, extending along the longitudinal axis A, and an encapsulant at least partially enclosing the plurality of LEDs, wherein the encapsulant comprises a luminescent material, the linear array of LEDs comprising a plurality N of blue LEDs emitting blue light and a plurality of M red LEDs emitting red light, the linear array of LEDs comprising a density of blue LEDs and a density of red LEDs, wherein the density of blue LEDs decreases and/or the density of red LEDs increases from the base portion to the top portion along at least a portion of the length (L), whereby the color temperature, $CT_L$, of the light emitted from the at least one LED filament decreases from the base portion to the top portion over at least a portion of the length of the at least one LED filament, and wherein a first section of the at least one LED filament is defined between the base portion and an intermediate portion of the at least one LED filament, and a second section of the at least one filament is defined between the intermediate portion and the top portion of the at least one LED filament, wherein the density of blue LEDs decreases and/or the density of red LEDs increases along the first section and remains constant along the second section, whereby the color temperature of the light emitted from the at least one LED filament decreases along the first section and remains constant along the second section.

2. The LED filament lamp according to claim 1, wherein the first section is shorter than the second section.

3. The LED filament lamp according to claim 1, wherein the LEDs in the array of LEDs having a pitch P are arranged at a constant pitch P.

4. The LED filament lamp according to claim 1, wherein the LEDs in the array of LEDs having a pitch P wherein said pitch increases for the blue LEDs and/or decrease for the red LEDs from the base portion to the top portion over at least a portion of the length of the at least one LED filament.

5. The LED filament lamp according to claim 1, wherein the number of blue LEDs N is at least 10, and wherein the number of red LEDs M is at least 10.

6. The LED filament lamp according to claim 5, wherein the number of blue LEDs N is larger than 1.3 times the number of red LEDs M, that is $N>1.3$ M.

7. The LED filament lamp according to claim 1, wherein the luminescent material at least partly converts blue light into converted light, preferably said converted light is green and/or yellow light.

8. The LED filament lamp according to claim 1, further comprising a diffusor element at least partially enclosing the at least one LED filament and arranged to diffuse at least a portion of the light emitted from the at least one LED filament.

9. The LED filament lamp according to claim 1, further comprising a control unit coupled to the at least one LED filament and configured to control the power supply to the at least one LED filament.

10. The LED filament lamp according to claim 9, comprising at least two LED filaments, wherein the control unit is configured to individually control the power supply of the at least two LED filaments and to individually control the operation of each LED of the plurality of LEDs of each LED filament.

11. The LED filament lamp according to claim 1, comprising at least two LED filaments, whereby the color temperature, $CT_{L1}$, of the light emitted from at least one first LED filament differs, at least along a portion thereof along the longitudinal axis, from the color temperature, $CT_{L2}$, of the light emitted from at least one second LED filament.

12. The LED filament lamp according to claim 1, wherein the color temperature of the light emitted from the at least one LED filament gradually varies along the length of the at least one LED filament from the base portion to the top portion in the range of 5000 K to 1500 K, more preferably 4000 K to 1700 K, and most preferred 2700 K to 1900 K.

13. The LED filament lamp according to claim 1, wherein the array of LEDs comprises a sequence of blue and red LEDs subdivided at least two sub-sequences, each sub-sequence consisting of a number of consecutive blue LEDs and a number of consecutive red LEDs, wherein in each sub-sequence the number of blue LEDs is constant and the number of red LEDs increases from the bottom portion to the top portion, or wherein in each sub-sequence the number of red LEDs is constant and the number of blue LEDs decreases from the bottom portion to the top portion.

14. The LED filament lamp according to claim 1, wherein the array of LEDs comprises a sequence of blue and red LEDs subdivided at least two sub-sequences, each sub-sequence consisting of a number of consecutive blue LEDs and a number of consecutive red LEDs, wherein for each sub-sequence the pitch between the blue LEDs is constant and the number of red LEDs increases from the bottom portion to the top portion, or wherein for each sub-sequence the pitch between the red LEDs is constant and the number of blue LEDs decreases from the bottom portion to the top portion.

* * * * *